United States Patent
Matsuoka et al.

(10) Patent No.: US 9,800,124 B2
(45) Date of Patent: Oct. 24, 2017

(54) ELECTRIC ROTARY MACHINE HAVING DUAL AXIAL STATORS WITH TERMINALS AND COIL SEGMENT DISTRIBUTING MEMBERS THEREBETWEEN

(71) Applicant: HONDA MOTOR CO., LTD., Tokyo (JP)

(72) Inventors: Yoshihisa Matsuoka, Wako (JP); Keisuke Azusawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 110 days.

(21) Appl. No.: 14/201,990

(22) Filed: Mar. 10, 2014

(65) Prior Publication Data

US 2014/0265694 A1 Sep. 18, 2014

(30) Foreign Application Priority Data

Mar. 15, 2013 (JP) .................................. 2013-053472

(51) Int. Cl.
*H02K 16/00* (2006.01)
*H02K 5/22* (2006.01)
*H02K 16/04* (2006.01)

(52) U.S. Cl.
CPC ............ *H02K 16/00* (2013.01); *H02K 5/225* (2013.01); *H02K 16/04* (2013.01); *H02K 2213/03* (2013.01); *H02K 2213/06* (2013.01)

(58) Field of Classification Search
CPC .... H02K 5/225; H02K 16/00; H02K 2213/03; H02K 2213/09; H02K 16/04; H02K 2213/06

(Continued)

(56) References Cited

U.S. PATENT DOCUMENTS 3,166,685 A * 1/1965 Hargreaves ............ H02K 15/16
310/112
4,496,868 A * 1/1985 Advolotkin ............ H02K 19/10
310/112

(Continued)

FOREIGN PATENT DOCUMENTS

CN 101299560 A 11/2008
JP H06-098495 A 4/1994

(Continued)

OTHER PUBLICATIONS

German Search Report dated Nov. 11, 2014, issued in corresponding German Application No. 10-2014-204-433.2; w/English Translation. (17 pages).

(Continued)

*Primary Examiner* — Michael Andrews
*Assistant Examiner* — Maged Almawri
(74) *Attorney, Agent, or Firm* — Westerman, Hattori, Daniels & Adrian, LLP (57) ABSTRACT

One embodiment provides an electric rotary machine unit including: a first electric rotary machine having a first stator; and a second electric rotary machine having a second stator. A coil configured by plural coil segments is disposed in each of the first and second stators. The first and second stators are disposed so that connecting portions of the coil segments or joint portions of leg portions of the coil segments are positioned between the stator cores thereof. First and second feeding portions are interposed between the first and second stators in the axial direction and spaced apart from each other in the circumferential direction.

7 Claims, 7 Drawing Sheets

(58) Field of Classification Search
USPC .......................................... 310/112, 71, 113
See application file for complete search history.

(56) References Cited

U.S. PATENT DOCUMENTS

| | | | | |
|---|---|---|---|---|
| 4,672,247 | A * | 6/1987 | Madsen | H02K 37/18 310/181 |
| 4,825,112 | A * | 4/1989 | Mineyama | H02K 3/525 310/194 |
| 4,924,124 | A * | 5/1990 | Kato | H02K 3/525 310/112 |
| 4,972,109 | A * | 11/1990 | Kakizaki | H02K 37/14 310/49.12 |
| 5,057,732 | A * | 10/1991 | Fukaya | H02K 3/525 310/194 |
| 5,260,616 | A * | 11/1993 | Mizutani | H02K 37/14 310/112 |
| 5,508,574 | A * | 4/1996 | Vlock | B60K 6/445 310/113 |
| 5,838,085 | A * | 11/1998 | Roesel, Jr. | F02N 11/04 310/112 |
| 5,990,590 | A * | 11/1999 | Roesel, Jr. | F02N 11/04 310/112 |
| 6,153,953 | A * | 11/2000 | Isozaki | H02P 8/14 310/112 |
| 6,208,058 | B1 * | 3/2001 | Taji | H02K 3/12 310/108 |
| 6,297,575 | B1 | 10/2001 | Yang | |
| 6,791,227 | B2 * | 9/2004 | Yasuhara | H02K 3/12 310/179 |
| 6,865,796 | B1 * | 3/2005 | Oohashi | H02K 3/12 242/432 |
| 7,843,106 | B2 * | 11/2010 | Huang | H02K 1/145 310/257 |
| 7,880,359 | B2 * | 2/2011 | Sonohara | B29C 45/14065 310/194 |
| 7,990,000 | B2 * | 8/2011 | Suzuki | H01F 5/02 29/592.1 |
| 8,294,318 | B2 * | 10/2012 | Bando | H02K 16/00 310/112 |
| 8,375,810 | B2 * | 2/2013 | Bae | G01L 3/10 73/862.334 |
| 2001/0026102 | A1 * | 10/2001 | Asao | H02K 9/06 310/59 |
| 2002/0030417 | A1 * | 3/2002 | Asao | H02K 3/12 310/201 |
| 2002/0117928 | A1 | 8/2002 | Yasuhara et al. | |
| 2003/0127935 | A1 * | 7/2003 | Mori | H02K 15/0081 310/206 |
| 2004/0061396 | A1 * | 4/2004 | Narita | H02K 17/02 310/112 |
| 2005/0146233 | A1 * | 7/2005 | Miyawaki | H02K 26/00 310/49.19 |
| 2006/0055279 | A1 * | 3/2006 | Zhan | H02K 1/145 310/257 |
| 2007/0040465 | A1 * | 2/2007 | Al-khayat | H02K 1/2793 310/179 |
| 2008/0088200 | A1 * | 4/2008 | Ritchey | H02K 16/00 310/268 |
| 2009/0058233 | A1 * | 3/2009 | Yajima | H02K 1/145 310/49.32 |
| 2009/0058374 | A1 * | 3/2009 | Evans | H02P 9/48 322/28 |
| 2009/0127948 | A1 * | 5/2009 | Shimizu | H02K 3/50 310/71 |
| 2009/0256437 | A1 * | 10/2009 | Miura | H02K 5/225 310/71 |
| 2011/0089776 | A1 * | 4/2011 | Kinpara | H02K 3/525 310/49.01 |
| 2012/0200190 | A1 * | 8/2012 | Matsuoka | H02K 3/12 310/179 |
| 2014/0300219 | A1 * | 10/2014 | Yamamoto | H02K 37/24 310/49.15 |

FOREIGN PATENT DOCUMENTS

| | | |
|---|---|---|
| JP | 11-243672 A | 9/1999 |
| JP | 2002-262497 A | 9/2002 |
| JP | 2011-91908 A | 5/2011 |
| WO | 2008/007806 A1 | 1/2008 |

OTHER PUBLICATIONS

With English Translation of Chinese Office Action dated Dec. 14, 2015, issued in corresponding Chinese Patent Application No. 201410093024.6.

Office Action dated Aug. 30, 2016, issued in counterpart Japanese Application No. 2013-053472. (3 pages).

* cited by examiner

--PRIOR ART--

ELECTRIC ROTARY MACHINE HAVING DUAL AXIAL STATORS WITH TERMINALS AND COIL SEGMENT DISTRIBUTING MEMBERS THEREBETWEEN

CROSS-REFERENCE TO RELATED APPLICATION(S)

This application claims priority from Japanese Patent Application No. 2013-053472 filed on Mar. 15, 2013, the entire contents of which are incorporated herein by reference.

FIELD

The embodiments relate, for example, to an electric rotary machine unit and more particularly to an electric rotary machine unit in which a first and second electric rotary machines are disposed to be opposite to each other in an axial direction.

BACKGROUND

Conventionally, there have been developed vehicles such as electric vehicles or hybrid vehicles in which an electric rotary machine is provided as a power source. In particular, in hybrid vehicles, it is strongly desired that an electric rotary machine module occupies less space to enable the coexistence with an engine or to ensure comfort in the form of dwelling comfort, riding comfort and the like. As one form of such an electric rotary machine module, there is one in which rotating axes of plural electric rotary machines are aligned in the same direction and the plural electric rotary machines are disposed adjacent to each other along the direction of rotating axes of rotors thereof (refer to, for example, WO-2008-007806-A).

Figure 7:
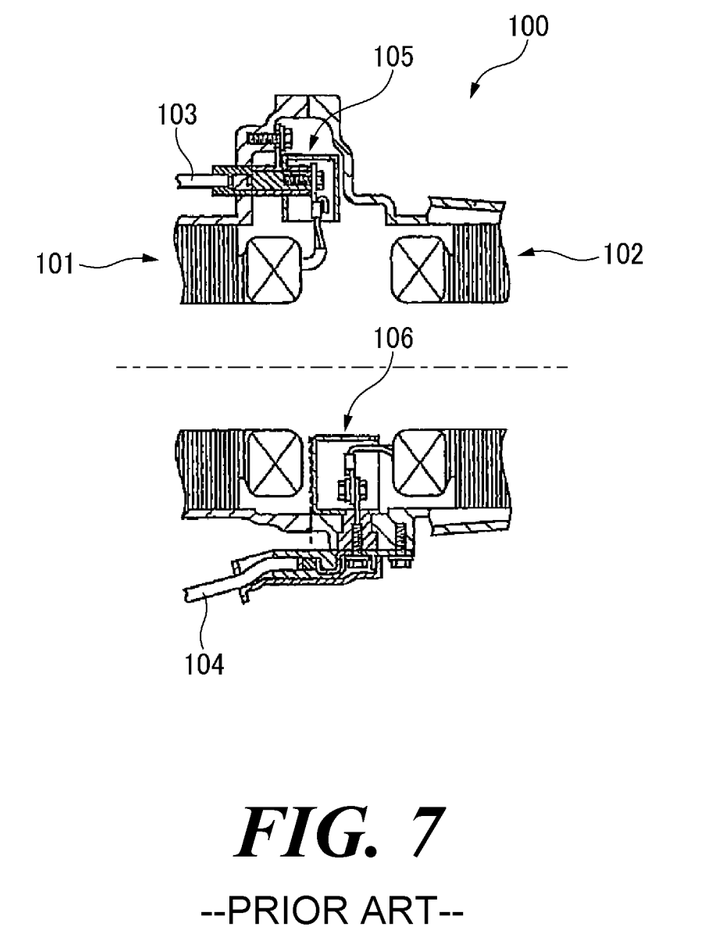
FIG. 7 is a vertical sectional view of conventional stators.

In WO-2008-007806-A, a motor module 100 includes, as shown in FIG. 7, a first and second electric rotary machines 101, 102 which are disposed adjacent to each other in the direction of rotating axes of rotors thereof. Feeding cables 103, 104 are provided to extend from the same direction and are electrically connected to the first and second electric rotary machines 101, 102 by first and second connecting mechanisms 105, 106. The first connecting mechanism 105 is disposed at an outer circumferential portion of the first electric rotary machine 101, and the second connecting mechanism 106 is disposed between the first and second electric rotary machines 101, 102 which lie adjacent to each other in the way described above, thereby suppressing dimension of the motor module 100 in the direction of the rotating axis thereof and improving assembling work of the electric rotary machines.

There is also known a segmented coil type electric rotary machine. In this type of electric rotary machine, coil segments which each are formed into a U-shape by a pair of leg portions and a connecting portion which connects together the pair of leg portions are inserted in slots in a stator core, and portions of the leg portions which project from opposite sides of the slots are bent in a circumferential direction of the stator core to be connected to corresponding coil segments for formation of a segmented coil, whereby the space factor of the segmented coil is enhanced.

In WO-2008-007806-A however, since the second connecting mechanism 106 is disposed between the first and second electric rotary machines 101, 102, the electric rotary machine module becomes large in the axial direction. Additionally, since the first connecting mechanism 105 is disposed at the outer circumferential portion of the first electric rotary machine 101, the module also becomes large in the radial direction. Thus, the installability of the electric rotary machine module into the vehicle is deteriorated, and an improvement in this respect is desired. Above all, in a hybrid vehicle in which an electric rotary machine is also disposed in an engine compartment where an engine, a transmission, a control unit and the like are installed, the desire for improvement becomes stronger. In addition, a feeding path from a power supply to the electric rotary machine becomes long, whereby the system loss becomes large, and therefore, there is also room for improvement in this respect.

In addition, in the segmented coil type electric rotary machine, although it is desired that a distributing member and a feeding portion are disposed in an axial position at an end of the segmented coil, in the event that they are simply disposed in the axial position, the axial dimension of the electric rotary machine module is increased, deteriorating the installability of the module into the vehicle.

SUMMARY

One object thereof is to provide an electric rotary machine unit which includes plural segmented coil type electric rotary machines disposed adjacent to each other along an axial direction thereof with a smaller dimension in the axial direction, and thereby enhancing the installability of the electric rotary machine unit into a vehicle and improving assembling work.

The invention provides following Aspects 1 to 6.

1. An electric rotary machine unit including:
   a first electric rotary machine (e.g., a first electric rotary machine 10A in embodiment) having a first stator (e.g., a first stator 12A in embodiment); and
   a second electric rotary machine (e.g., a second electric rotary machine 10B in embodiment) having a second stator (e.g., a second stator 12B in embodiment),
   wherein each of the first and second stators includes:
   a stator core (e.g., stator cores 13A, 13B in embodiment);
   slots (e.g., slots 14A, 14B in embodiment) formed in the stator core; and
   a coil (e.g., stator coils 15A, 15B in embodiment) configured by plural U-shaped coil segments (e.g., coil segments 20 in embodiment) each having a pair of leg portions (e.g., leg portions 21 in embodiment) and a connecting portion (e.g., a connecting portion 22 in embodiment), each coil segment being inserted into the corresponding slot such that projecting portions (e.g., projecting portions 21a in embodiment) of the leg portions projecting from the slots opposite to the connecting portion are bent in a circumferential direction of the stator core and being joined with corresponding coil segments,
   wherein the first and second stators are disposed so that the connecting portions of the coil segments thereof or joint portions (e.g., joint portions 21b in embodiment) of the leg portions are positioned between the stator cores thereof,
   wherein the first stator includes a first feeding portion (e.g., a first feeding portion 25A in embodiment) through which electric power is supplied from an external power supply to the coil thereof and the second stator includes a second feeding portion (e.g., a second feeding portion 25B in embodiment) through which electric power is supplied from the external power supply to the coil thereof, and wherein the first and second feeding portions are interposed between the first stator and the second stator in the axial direction and spaced apart from each other in the circumferential direction.

2. The unit of Aspect 1,
wherein, when viewed in the axial direction, the first and second feeding portions are separated laterally with respect to a line (e.g., a line VL in embodiment) which passes through an axis of the first and second stators (e.g., an axis O in embodiment) and extends in a vertical direction.

3. The unit of Aspect 2,
wherein, when viewed in the axial direction, the first and second feeding portions are disposed closer to power supply terminal bases (e.g., power supply terminal bases 28A, 28B in embodiment) than a line (e.g., a line HL in embodiment) which passes through the axis of the first and second stators and extends laterally in a horizontal direction.

4. The unit of Aspect 1,
wherein the first and second feeding portions have
one ends which are individually connected to the coils of the first and second stators, and
other ends provided with connecting terminals (e.g., connecting terminals 27U, 27V, 27W in embodiment) which are connected to the power supply terminal bases, and
wherein each of the connecting terminals in the first and second feeding portions has the same position in the axial direction (e.g., axial positions X1 in embodiment).

5. The unit of Aspect 1,
wherein connecting terminals of the first and second feeding portions are positioned equidistant from end faces (e.g., the other surfaces 13d in embodiment) of the stator cores where the first and second feeding portions are disposed so that their axial distances (e.g., axial distances a1, b1 in embodiment) from the end faces are equal to each other.

6. An electric rotary machine unit including:
a first electric rotary machine (e.g., a first electric rotary machine 10A in embodiment) having a first stator (e.g., a first stator 12A in embodiment); and
a second electric rotary machine (e.g., a second electric rotary machine 10B in embodiment) having a second stator (e.g., a second stator 12B in embodiment),
wherein each of the first and second stators includes:
a stator core (e.g., stator cores 13A, 13B in embodiment);
slots (e.g., slots 14A, 14B in embodiment) formed in the stator core; and
a coil (e.g., stator coils 15A, 15B in embodiment) configured by plural U-shaped coil segments (e.g., coil segments 20 in embodiment) each having a pair of leg portions (e.g., leg portions 21 in embodiment) and a connecting portion (e.g., a connecting portion 22 in embodiment), each coil segment being inserted into the corresponding slot such that projecting portions (e.g., projecting portions 21a in embodiment) of the leg portions projecting from the slots opposite to the connecting portion are bent in a circumferential direction of the stator core and being joined with corresponding coil segments,
wherein the first stator includes a portion where the projecting portions of the corresponding coil segments are connected to each other by using a first distributing member (e.g., a first distributing member 24A in embodiment), and the second stator includes a portion where the projecting portions of the corresponding coil segments are connected to each other by using a second distributing member (e.g., a second distributing member 24B in embodiment),
wherein the first and second stators are disposed so that surfaces (e.g., the other surfaces 13d in embodiment) thereof where the first and second distributing members are provided face opposite each other, and
wherein the first and second distributing members are disposed between the first stator and the second stator in an axial direction and are disposed apart from each other in a circumferential direction.

According to Aspect 1, the first and second feeding portions through which electric power is supplied from an external power supply to the coils are disposed between the first stator and the second stator in the axial direction and are disposed apart from each other in the circumferential direction. Therefore, the two stators having the first and second feeding portions, respectively, can be installed in the vehicle while suppressing an axial dimension of the electric rotary machine unit and preventing the interference between the first and second feeding portions.

According to Aspect 2, the first and second feeding portions are separated laterally with respect to the line which passes through the axis of the first and second stators and extends in the vertical direction, and therefore, the first and second electric rotary machines are allowed to have the same construction except for lamination thicknesses thereof, thereby enhancing the assemblability of the constituent parts and suppressing the manufacturing cost.

According to Aspect 3 the first and second feeding portions are disposed closer to the power supply terminal bases than the line which passes through the axis of the first and second stators and extends laterally in the horizontal direction, and therefore, the coils of the electric rotary machines and the power supply can be connected together over a shortest distance, whereby the electrical loss is reduced, enhancing the fuel economy of the vehicle.

According to Aspect 4, the axial positions of the connecting terminals of the first and second feeding portions are equal to each other, and therefore, axial positions where the first and second feeding portions are fastened to the power supply terminal bases can be aligned, thereby enhancing the assemblability.

According to Aspect 5, the connecting terminals are provided equidistant from the end surfaces of the stator cores where the first and second feeding portions are positioned so that the axial distances thereof from the end faces become equal to each other. Therefore, the first and second stators are allowed to have the same configuration, thereby suppressing the manufacturing cost.

According to Aspect 6, the first and second stators are disposed so that the surfaces thereof where the first and second distributing members are provided face opposite each other, and the first and second distributing members are disposed between the first stator and the second stator in the axial direction and are disposed apart from each other in the circumferential direction. Therefore, the two stators having the first and second feeding portions, respectively, can be installed in the vehicle while suppressing an axial dimension of the electric rotary machine unit and preventing the interference between the first and second feeding portions. The first and second distributing members are disposed apart from each other in the circumferential direction so as to ensure the electrical insulation therebetween.

DETAILED DESCRIPTION

An electric rotary machine unit according to an embodiment will be described based on the accompanying drawings. The drawings are to be seen in such a way that given reference numerals look properly.

Figure 1:
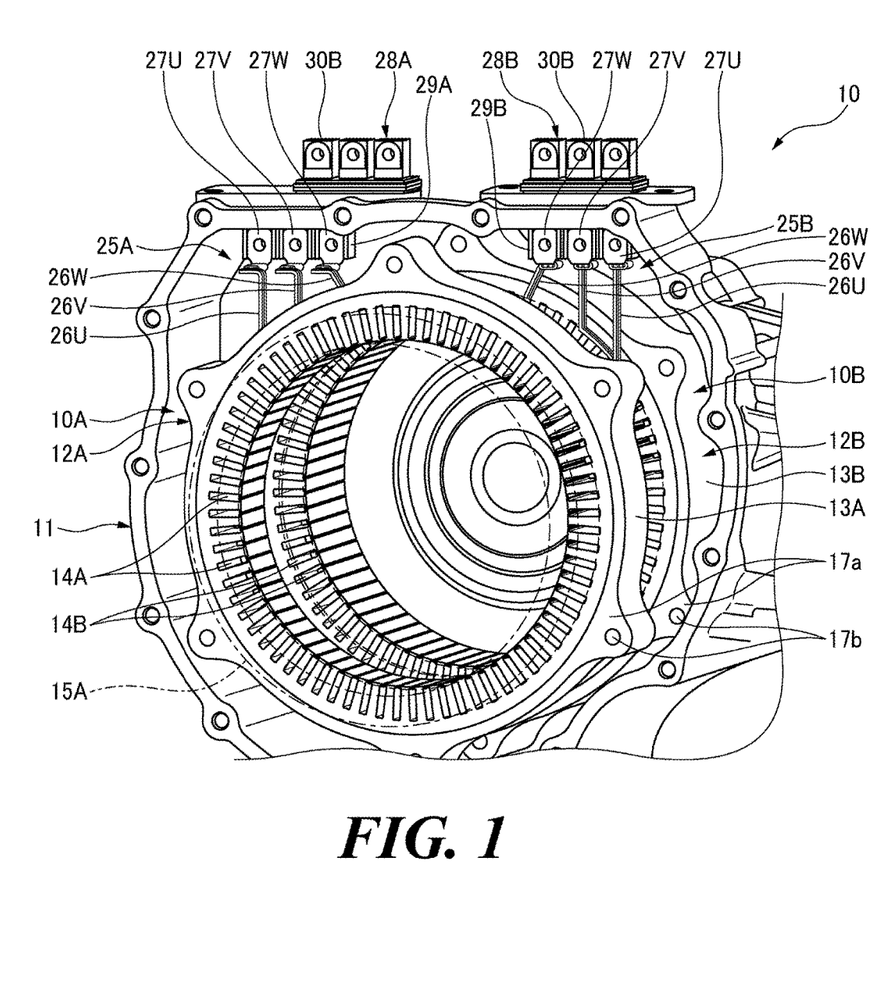
FIG. 1 is a perspective view of stators of an electric rotary machine unit according to the embodiment.
Figure 2:
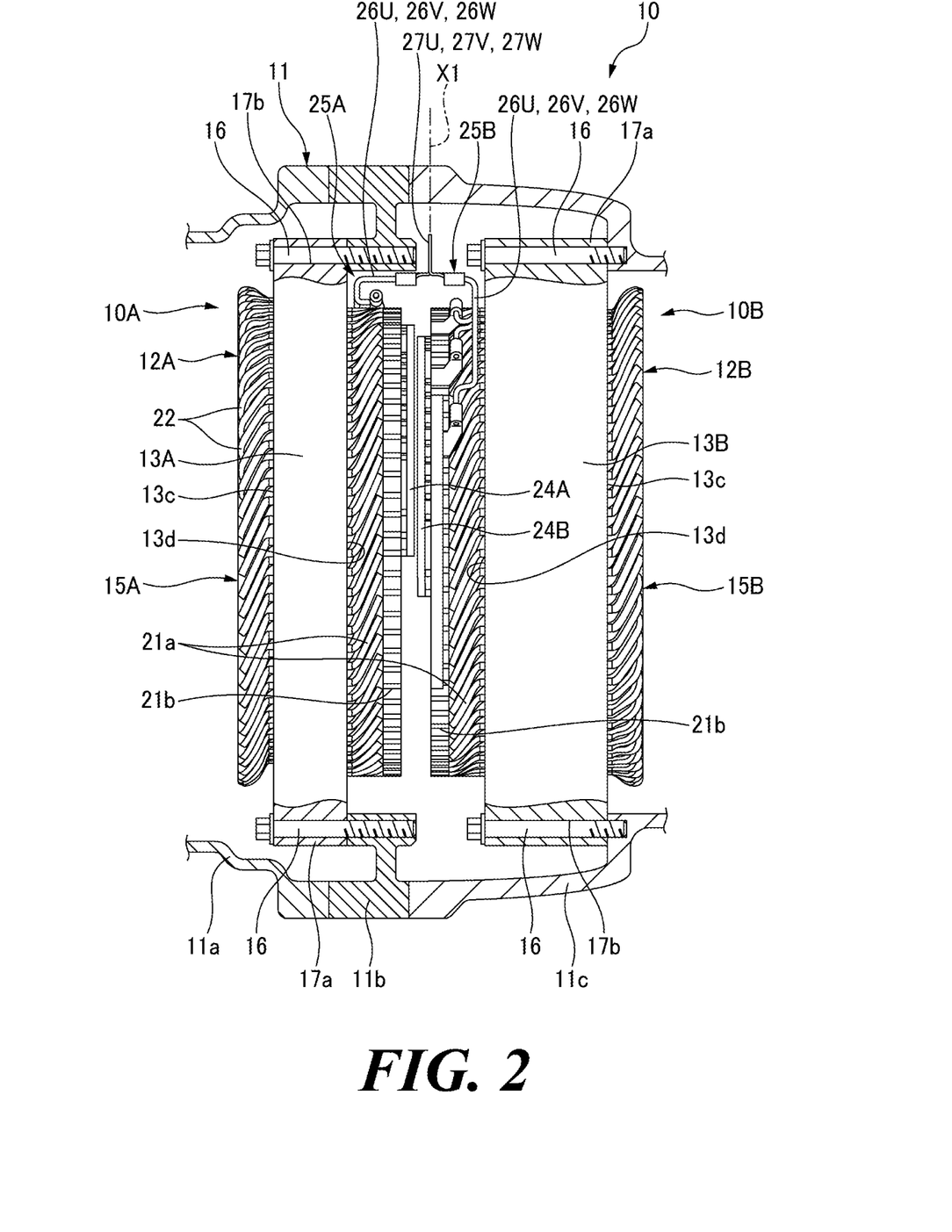
FIG. 2 is a vertical sectional view of the stators shown in FIG. 1.

As shown in FIGS. 1 and 2, an electric rotary machine unit 10 of this embodiment includes a first stator 12A of a first electric rotary machine 10A and a second stator 12B of a second electric rotary machine 10B which are accommodated within a casing 11 so as to be disposed opposite to each other in an axial direction. A rotor, not shown, is disposed rotatably inside the first and second stators 12A, 12B. In this embodiment, the first electric rotary machine 10A constitutes a generator, and the second electric rotary machine 10B constitutes a motor.

The first stator 12A includes a first stator core 13A in which plural slots 14A which penetrate axially are disposed at predetermined intervals in a circumferential direction and a stator coil 15A of plural phases (for example, a U phase, a V phase, a W phase) which is accommodated in the slots 14A. The second stator 12B includes a second stator core 13B in which plural slots 14B which penetrate axially are disposed at predetermined intervals in a circumferential direction and a stator coil 15B of plural phases (for example, a U phase, a V phase, a W phase) which is accommodated in the slots 14B.

In FIG. 2, the casing 11 includes a left case 11a, a middle case 11b and a right case 11c. The first stator core 13A is fixed to the middle case 11b with bolts 16 which are inserted through bolt holes 17b which are provided individually in plural mounting portions 17a which project in a radial direction. The second stator core 13B is fixed to the right case 11c similarly with bolts 16 which are inserted through the bolt holes 17b which are provided in plural mounting portions 17a which project in the radial direction.

Figure 3:
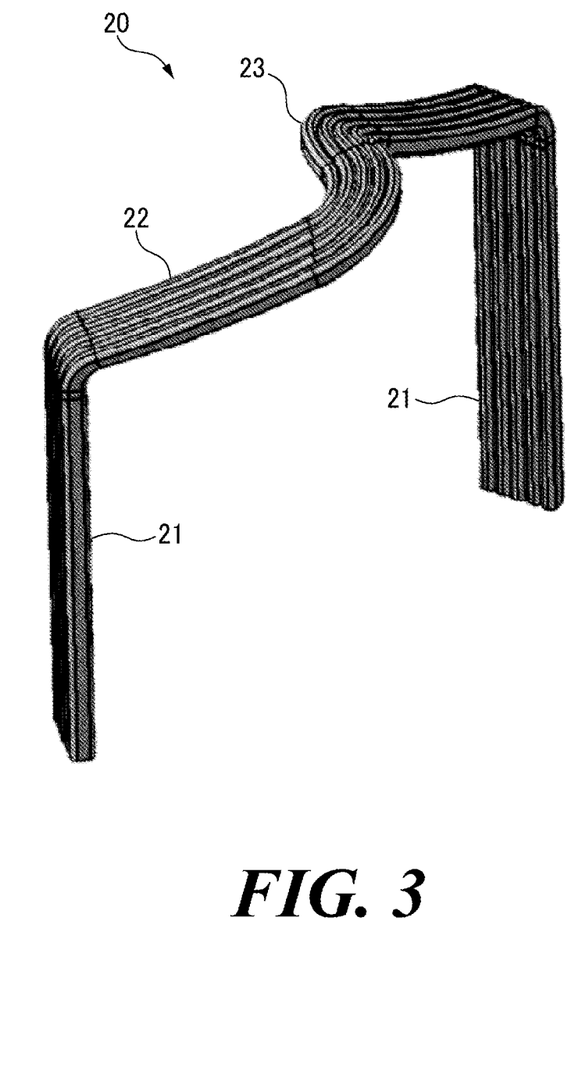
FIG. 3 is a perspective view of a coil segment which makes up a stator coil.

The first and second electric rotary machines 10A, 10B are segmented coil type electric rotary machines, and the stator coils 15A, 15B each include plural substantially U-shaped coil segments 20 which are each made up of a pair of leg portions 21 and a connecting portion 22 which connects both the leg portions 21 together at one end portions thereof, as shown in FIG. 3. In each of the plural coil segments 20, a predetermined number of conductors having a rectangular cross section (flat angular conductors) are aligned into a bundle in such a way that wider surfaces thereof are disposed opposite to each other for insertion into the slots 14A, 14B. An S-shaped curved portion 23 which is curved into an S-shape in the direction in which the conductors are aligned is formed at a center of the connecting portion 22 so that one leg portion 21 is inserted in a radially inner portion of one of the slots 14A, 14B and the other leg portion 21 is inserted in a radially outer portion of the other of the slots 14A, 14B.

In the stator coils 15A, 15B, with pluralities of connecting portions 22 disposed on surfaces 13c of the first and second stator cores 13A 13B, pairs of leg portions 21 are disposed so as to extend through the slots 14A, 14B to project therefrom, and projecting portions 21a of the leg portions 21 which project from the slots 14A, 14B are bent in the circumferential direction so as to be connected to corresponding leg portions 21 on the other surfaces 13d of the first and second stator cores 13A, 13B.

The first and second stators 12A, 12B have the same construction except for axial lengths (lamination thicknesses) thereof. Namely, the first and second stators 12A, 12B are different in that the first and second stator cores 13A, 13B have different axial widths, and the leg portions 21 of the coil segments 20 have different axial lengths accordingly. The first and second stators 12A, 12B may have the same axial length, in which case the first and second stators 12A, 12B are configured as identical stators.

First and second distributing members 24A, 24B are disposed on the other surfaces 13d of the first and second stator cores 13A, 13B so that the leg portions 21 of the corresponding coil segments 20 of the individual phases are connected to each other or a middle point connection is effected. The first and second distributing members 24A, 24B are each formed by bending plural long conductive metal plates and are disposed so as to extend further axially outwards than the joint portions 21b of the coil segments 20, making up the stator coils 15A, 15B, respectively.

Figure 5:
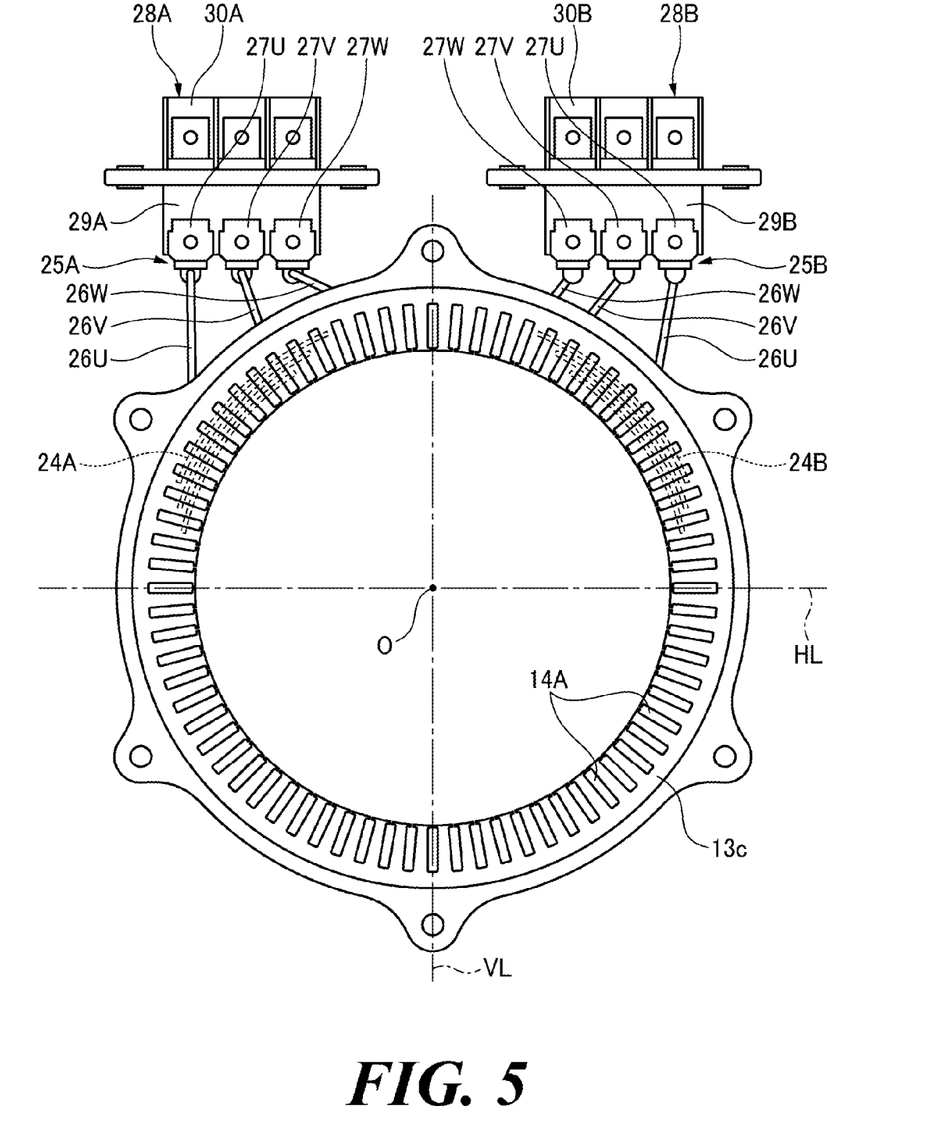
FIG. 5 is a front view of the stator when seen from the side of the first stator with the stator coil removed.

First and second feeding portions 25A, 25B are disposed on the other surfaces 13d of the first and second stator cores 13A, 13B, respectively. As shown in FIG. 5, the first and second feeding portions 25A, 25B each have three lead wires 26U, 26V, 26W which are connected, respectively, to the individual phases (U phase, V phase, W phase) of either of the stator coils 15A, 15B of the first and second stators 12A, 12B at one ends thereof. Connecting terminals 27U, 27V, 27W are connected to the other ends of the lead wires 26U, 26V, 26W, respectively.

Figure 4A:
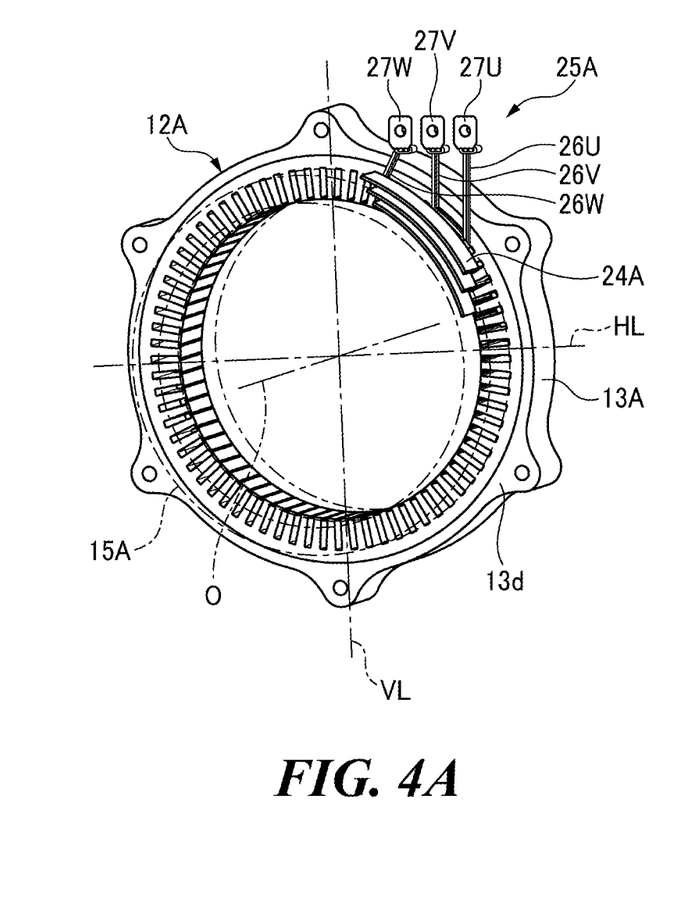
FIG. 4A is a perspective view of a first electric rotary machine.
Figure 4B:
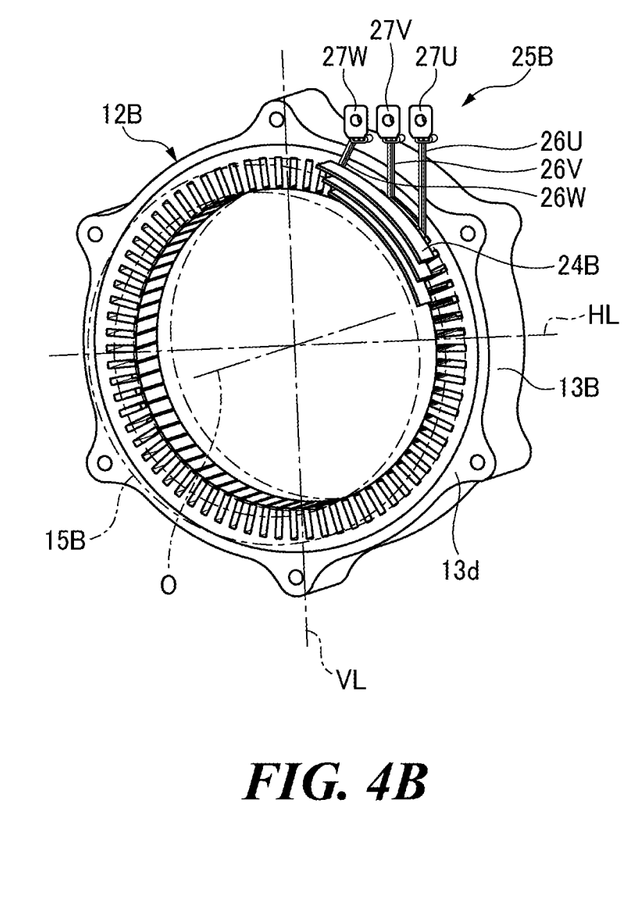
FIG. 4B is a perspective view of a second electric rotary machine.

Here, as shown in FIGS. 4A and 4B, when viewed from the side of the other surfaces 13d of the first and second stator cores 13A, 13B, the first and second distributing members 24A, 24B are both disposed on a right-hand side with respect to a line VL which passes through an axis O of the first and second stator cores 12A, 12B and extends in a vertical direction and are disposed above a line HL which passes through the axis O of the first and second stators 12A, 12B and extends laterally in a horizontal direction. Similarly, when viewed from the side of the other surfaces 13d of the first and second stator cores 13A, 13B, the first and second feeding portions 25A, 25B are both disposed on the right-hand side with respect to the line VL and are disposed above the line HL.

The first and second stators 12A, 12B are disposed so that the sides where the joint portions 21b of the leg portions 21 of the corresponding coil segments 20 are disposed, that is, the other surfaces 13d of the first and second stator cores 13A, 13B face opposite to each other.

By adopting this configuration, as shown in FIGS. 2 and 5, the first and second distributing members 24A, 24B are disposed between the first stator 12A and the second stator 12B in the axial direction and are disposed apart from each other in the circumferential direction with respect to the line VL which passes through the axis O of the first and second stators 12A, 12B and extends in the vertical direction. Consequently, it is possible to dispose the two stators 12A, 12B which have the distributing members 24A, 24B while suppressing the axial length of the electric rotary machine unit 10. The electrical insulation between the distributing members 24A, 24B is ensured.

The first and second feeding portions 25A, 25B are also disposed between the first stator 12A and the second stator 12B in the axial direction and are disposed apart from each other in the circumferential direction. Specifically, when viewed in the axial direction, the first and second feeding portions 25A, 25B are separated laterally with respect to the line VL which passes through the axis O of the first and second stators 12A, 12B and extends in the vertical direction and are disposed above the line HL which passes through the axis O of the first and second stators 12A, 12B and extends laterally in the horizontal direction.

The respective connecting terminals 27U, 27V, 27W of the first and second feeding portions 25A, 25B are passed through the casing 11 to be connected to corresponding terminals (not shown) which are provided on interior connecting portions 29A, 29B of first and second power supply terminals 28A, 28B which are fixed to an upper portion of the casing 11 (the right case 11c). Exterior terminals (not shown) which electrically communicate with the terminals of the interior connecting portions 29A, 29B are disposed on exterior connecting portions 30A, 30B of the power supply terminal bases 28A, 28B, and power supply cables are led out from a power supply, not shown, to be connected to the exterior terminals to thereby supply electric power to the stator coils 15A, 15B.

The first and second power supply terminal bases 28A, 28B are disposed between the first stator 12A and the second stator 12B and on the left- and right-hand sides of the line VL which passes through the axis O of the first and second stators 12A, 12B and extends in the vertical direction so as to correspond to the disposition of the first and second feeding portions 25A, 25B. The first and second power supply terminal bases 28A, 28B are provided on the right case 11c so that their axial positions coincide with axial positions of the first and second feeding portions 25A, 25B.

In this embodiment, although the first and second distributing members 24A, 24B are substantially disposed in a symmetrical fashion with respect to the line VL, the invention is not limited thereto, and hence, any configuration may be adopted as long as the first and second distributing members 24A, 24B are separated laterally with respect to the line VL. Similarly, although the first and second feeding portions 25A, 25B are substantially disposed in a symmetrical fashion with respect to the line VL, any configuration may be adopted as long as the first and second feeding portions 25A, 25B are separated laterally with respect to the line VL even though they are disposed in an asymmetrical fashion according to the layout of the power supply terminal bases 28A, 28B.

In the electric rotary machine unit 10, the first and second stators 12A, 12B have the same construction except for their lamination thicknesses, whereby the first and second stators 12A, 12B can be assembled to the casing 11 from the same direction with the surfaces 13d from which the leg portions 21 project caused to face opposite to each other in the axial direction, and further, the first and second feeding portions 25A, 25B can be fastened to the first and second power supply terminal bases 28A, 28B from the same direction, thereby enhancing largely the manufacturability of the electric rotary machine unit 10.

Thus, according to the electric rotary machine unit 10, the first and second stators 12A, 12B are disposed so that the projecting portions 21a of the leg portions 21 of the plural coil segments 20 thereof are positioned between the first and second stator cores 13A, 13B of the first and second stators 12A, 12B. The first and second stators 12A, 12B includes the first and second feeding portions 25A, 25B from which electric power is supplied from the external power supply to the corresponding stator coils 15A, 15B. The first and second feeding portions 25A, 25B are disposed between the first stator 12A and the second stator 12B in the axial direction and are disposed apart from each other in the circumferential direction. Thus, the two stators 12A, 12B which have the first and second feeding portions 25A, 25B can be installed in the vehicle while suppressing the axial dimension of the electric rotary machine unit 10 and preventing the interference between the first and second feeding portions 25A, 25B.

When viewed in the axial direction, the first and second feeding portions 25A, 25B are separated laterally with respect to the line VL which passes through the axis O of the first and second stators 12A, 12B and extends in the vertical direction, and therefore, the first and second stators 12A, 12B can have the same constriction except for their lamination thicknesses, thereby enhancing the manufacturability of the electric rotary machine unit 10 and suppressing the manufacturing cost.

When viewed in the axial direction, the first and second feeding portions 25A, 25B are disposed closer to the power supply terminal bases 28A, 28B than the line HL which passes through the axis O of the first and second stators 12A, 12B and extends laterally in the horizontal direction, and therefore, the stator coils 15A, 15B can be connected to the power supply over the shortest length, whereby the electric loss is reduced to thereby enhance the fuel economy.

In this embodiment, while the first and second feeding portions 25A, 25B are disposed above the line HL, the invention is not limited thereto, and hence, the first and second feeding portions 25A, 25B may be disposed below the line HL when the power supply terminal bases 28A, 28B are disposed on a lower side of the first and second stators 12A, 12B.

The axial positions X1 of the connecting terminals 27U, 27V, 27W of the first and second feeding portions 25A, 25B are the same, and therefore, axial positions where the connecting terminals 27U 27V, 27W are fastened to the first and second power supply terminal bases 28A, 28B can be aligned, thereby enhancing the assemblability of the connecting terminals 27U, 27V, 27W to the power supply terminal bases 28A, 28B.

The first and second stators 12A, 12B are disposed so that the surfaces 13d where the first and second distributing members 24A, 24B which connect the projecting portions 21a of the corresponding coil segments 20 together are provided face opposite to each other, and the first and second distributing portions 24A, 24B are disposed between the first stator 12A and the second stator 12B in the axial direction and are disposed apart from each other in the circumferential direction. Therefore, the two stators 12A, 12B which have the first and second distributing members 24A, 24B can be installed in the vehicle while suppressing the axial dimension of the electric rotary machine unit 10. The first and second distributing members 24A, 24B are disposed apart from each other in the circumferential direction, thereby surely electrically insulating between the first and second distributing members 24A, 24B.

The invention is not limited to the embodiment that has been described heretofore, and hence, the invention can be modified or improved as required.

The invention can be applied to a configuration in which the first and second stators 12A, 12B are disposed so that the connecting portions 22 of the plural coil segments 20 are disposed between the stator cores 13A, 13B of the first and second stators 12A, 12B, and the first and second feeding portions 25A, 25B are connected to the connecting portions 22 of the stator coils 15A, 15B. Namely, as this occurs, too, the first and second feeding portions 25A, 25B should be disposed between the first stator 12A and the second stator 12B in the axial direction and be disposed apart from each other in the circumferential direction.

Figure 6:
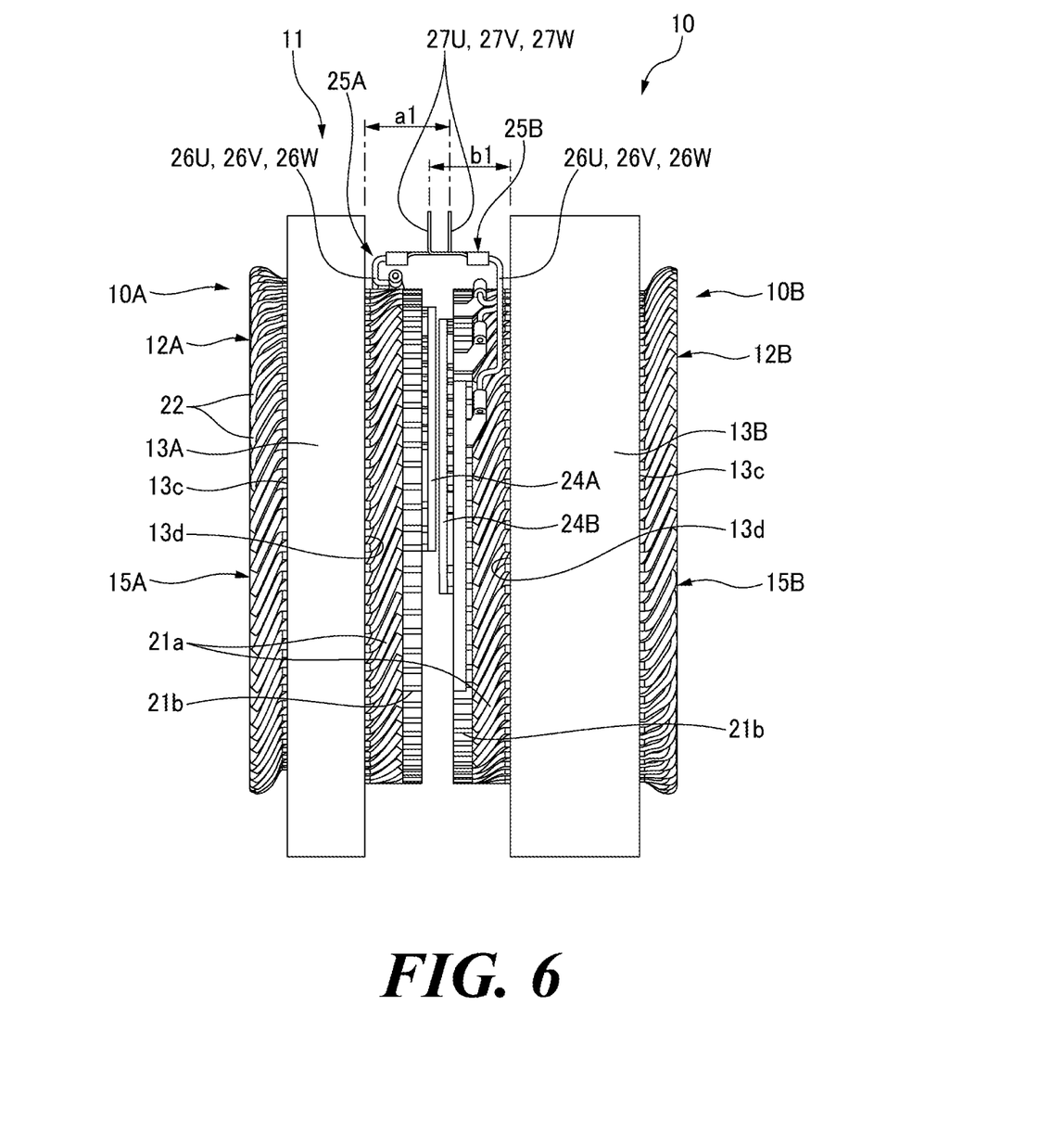
FIG. 6 is a side view of stators of an electric rotary machine unit according to a modified example of the embodiment.

As shown in FIG. 6, the invention may adopt a configuration in which the connecting terminals 27U, 27V, 27W of the first and second feeding portions 25A, 25B are positioned equidistant from the other surfaces 13d of the stator cores 13A, 13B where the first and second feeding portions 25A, 25B are disposed so that their axial distances a1, b1 from the other surfaces 13d become equal to each other. By adopting this configuration, the first and second feeding portions 25A, 25B are allowed to have the same configuration, thereby further suppressing the manufacturing cost.

The invention claimed is:

1. An electric rotary machine unit including:
a first electric rotary machine having a first stator; and
a second electric rotary machine having a second stator,
wherein each of the first and second stators includes:
  a stator core;
  slots formed in the stator core; and
  a coil configured by plural U-shaped coil segments each having a pair of leg portions and a connecting portion, each coil segment being inserted into the corresponding slot such that projecting portions of the leg portions projecting from the slots opposite to the connecting portion are bent in a circumferential direction of the stator core and being joined with corresponding coil segments,
wherein the first and second stators are disposed so that the connecting portions of the coil segments thereof or joint portions of the leg portions are positioned between the stator cores thereof,
wherein the first stator includes a first feeding portion through which electric power is supplied from an external power supply to the coil thereof and the second stator includes a second feeding portion through which electric power is supplied from the external power supply to the coil thereof, and
wherein the first and second feeding portions are disposed between the first stator and the second stator in the axial direction and are disposed to be spaced apart from each other in the circumferential direction, the first and second feeding portions each have three phases of lead wires, and
wherein, when viewed in the axial direction, the first and second feeding portions are separated laterally with respect to a line which passes through an axis of the first and second stators and extends in a vertical direction such that the first feeding portion is entirely located on one lateral side of the line and the second feeding portion is entirely located on an opposite lateral side of the line opposite to the one lateral side when viewed in the axial direction, and the first and second feeding portions are entirely spaced apart from each other along the circumferential direction when viewed in the axial direction such that the three phases of lead wires of the first feeding portion and the three phases of lead wires of the second feeding portion are arranged along the circumferential direction, and the three phases of lead wires of the first feeding portion do not overlap with the three phases of lead wires of the second feeding portion when viewed in the axial direction,
wherein the three phases of lead wires of the first feeding portion each have one end connected to the coil of the first stator and an opposite end connected to corresponding one of first three connecting terminals of the first feeding portion, the three phases of lead wires of the second feeding portion each have one end connected to the coil of the second stator and an opposite end connected to corresponding one of second three connecting terminals of the second feeding portion, the three phases of lead wires of the first and second feeding portions being exposed,
wherein the three phases of lead wires of the first feeding portion have different length from one another such that the first three connecting terminals of the first feeding portion are aligned with each other along a straight line when viewed in the axial direction, and the three phases of lead wires of the second feeding portion have different length from one another such that the second three connecting terminals of the second feeding portion are aligned with each other along a straight line when viewed in the axial direction,
wherein the first three connecting terminals of the first feeding portion and the second three connecting terminals of the second feeding portion are aligned with each other along the straight line when viewed in the axial direction.

2. The unit of claim 1,
wherein, when viewed in the axial direction, the first and second feeding portions are disposed closer to power supply terminal bases than a line which passes through the axis of the first and second stators and extends laterally in a horizontal direction.

3. The unit of claim 1,
wherein each of the connecting terminals in the first and second feeding portions has the same position in the axial direction.

4. The unit of claim 1,
wherein the connecting terminals of the first and second feeding portions are positioned equidistant from end faces of the stator cores where the first and second feeding portions are disposed so that their axial distances from the end faces are equal to each other.

5. The unit of claim 1,
wherein
the first three connecting terminals and the second three connecting terminals are disposed at the same axial position.

6. An electric rotary machine unit including:
a first electric rotary machine having a first stator; and
a second electric rotary machine having a second stator,
wherein each of the first and second stators includes:
  a stator core;
  slots formed in the stator core; and
  a coil configured by plural U-shaped coil segments each having a pair of leg portions and a connecting portion, each coil segment being inserted into the corresponding slot such that projecting portions of the leg portions projecting from the slots opposite to the connecting portion are bent in a circumferential direction of the stator core and being joined with corresponding coil segments, wherein the first stator includes a portion where the projecting portions of the corresponding coil segments are connected to each other by using a first distributing member, and the second stator includes a portion where the projecting portions of the corresponding coil segments are connected to each other by using a second distributing member, wherein the first and second stators are disposed so that surfaces thereof where the first and second distributing members are provided face opposite each other, and wherein the first and second distributing members are disposed between the first stator and the second stator in an axial direction and are disposed entirely apart from each other along a circumferential direction when viewed in the axial direction.

7. The unit of claim 6, wherein, when viewed in the axial direction, the first and second distributing members are separated laterally with respect to a line which passes through an axis of the first and second stators and extends in a vertical direction such that the first distributing member is entirely located on one lateral side of the line and the second distributing member is entirely located on an opposite lateral side of the line opposite to the one lateral side, and the first and second distributing members are entirely spaced apart from each other in the circumferential direction.

* * * * *